United States Patent [19]

Baxter et al.

[11] Patent Number: 4,708,837

[45] Date of Patent: Nov. 24, 1987

[54] METHOD AND APPARATUS FOR INSULATING ELECTRICAL CONDUCTOR

[75] Inventors: Gordon D. Baxter; James C. Grant, both of Kingston, Canada

[73] Assignee: Northern Telecom Limited, Montreal, Canada

[21] Appl. No.: 849,628

[22] Filed: Apr. 9, 1986

[51] Int. Cl.⁴ .............................................. B29C 47/92
[52] U.S. Cl. .................................. 264/40.4; 264/40.5; 264/40.7; 264/174; 425/113; 425/140; 425/141; 425/191; 425/192 R; 425/465; 425/466
[58] Field of Search ...................... 264/40.1, 174, 40.7, 264/40.4, 40.5; 425/140–141, 113, 465, 114, 466, 191, 192 R

[56] References Cited

U.S. PATENT DOCUMENTS

| 2,669,754 | 2/1954 | Chadbourne | 264/174 |
| 3,254,369 | 6/1966 | Ehrlich | 425/466 |
| 3,402,427 | 9/1968 | Christofas et al. | 264/174 |
| 3,502,752 | 3/1970 | Brown | 425/141 |
| 3,538,547 | 11/1970 | Drabb | 425/191 |
| 3,646,186 | 2/1972 | Hager | 264/174 |
| 4,257,991 | 3/1981 | Kirjavainen | 264/40.2 |
| 4,592,881 | 6/1986 | Kyriakis | 264/40.1 |
| 4,605,525 | 8/1986 | Baxter | 264/40.1 |
| 4,659,424 | 4/1987 | Baxter et al. | 264/174 |

FOREIGN PATENT DOCUMENTS

| 57-110430 | 7/1982 | Japan | 264/40.1 |
| 60-72113 | 4/1985 | Japan | 264/40.7 |

Primary Examiner—Jeffery Thurlow
Attorney, Agent, or Firm—R. J. Austin

[57] ABSTRACT

Extrusion apparatus for conductor wire in which a core tube for guiding the wire is controllably movable axially so as to adjust the cross-sectional area of the flow passage for molten polymeric dielectric material moving towards the die orifice. The use of the adjustable core tube minimizes the degree of draw down of the conductor wire.

9 Claims, 3 Drawing Figures

METHOD AND APPARATUS FOR INSULATING ELECTRICAL CONDUCTOR

This invention relates to methods and apparatus for insulating electrical conductor wires.

The electrical properties of an insulated electrical conductor wire are determined partly by the properties of the insulating material itself and its thickness surrounding the wire and also partly by the diameter of the conductor wire. In the manufacture of insulated conductor wires, it is essential for certain predetermined electrical characteristics to be obtained, e.g. where the conductor wire is to be used in the manufacture of a telecommunications cable. These essential electrical properties may only be obtained if the diameter of the conductor wire is controlled within extremely close tolerances during the insulating process. It has been found that while an electrical conductor is being provided with a covering layer of polymeric insulating material by extrusion, there is a tendency for the conductor to become reduced in diameter as it passes through the extrusion die.

The degree of diameter reduction is a function of the differential in velocities of the conductor wire and the molten polymeric material moving through the die orifice. For instance, in a case where the velocity of the molten polymeric material is equal to or greater than that of the conductor wire through the die orifice, then no stretch occurs in the wire and the diameter is maintained at that desired. On the other hand, in a case where the speed of the molten polymeric material is slower than that of the conductor wire at the die orifice, it has been found that a diameter reducing drawing action takes place upon the wire. Such diameter reductions are in fact excessive as they cause a departure from the desired electrical characteristics of the insulated wire. For instance, when insulating a 22 AWG wire, i.e. of 0.0201 inches diameter, it is not uncommon for a drawing action to result in a final diameter of 0.0190 inches. While such a reduction is of the order of 0.0011 inches and may appear to be minimal, nevertheless it lies outside the tolerance reduction of 0.0003 inches (i.e. to a diameter of 0.0198 inches) for achieving the desired electrical characteristics.

The attainment of substantially equal speeds for the molten polymeric material and the conductor wire through the die orifice is desirable but cannot be achieved on a continuous basis.

While no diameter reduction results in conductor wire if the extrusion speed of the molten polymeric material exceeds that of the conductor wire through the die orifice, there is the disadvantage that this results in die swell in the polymeric material after extrusion. Die swell produces an outside diameter to the insulation which is greater than that required and causes variation from the desired electrical characteristics of the insulated wire. In addition to this, when die swell takes place, more of the dielectric material is used than would be necessary if the insulated conductor wire were made to its desired diameter.

The invention provides a method and apparatus which produces an insulated conductor in which the diameter of the conductor wire and also the outside diameter of the insulation may be held within extremely close tolerances.

Accordingly, the present invention provides an apparatus for insulating an electrical conductor wire comprising an extruder cross-head having an extrusion die defining a die orifice, internal wall means defining a flow passage for directing molten polymeric dielectric material to the die orifice, a core tube within the cross-head and upstream from the die orifice, the core tube defining a guide passage for directing the conductor wire through the die orifice as it moves along a passline, mounting means for the core tube to render it adjustable into any desired position along the passline drive means operably connected to the core tube to controllably adjust the distance between the core tube and the wall means and thereby adjust the cross-sectional area of the flow passage, a monitoring means downstream from the cross-head for monitoring a parameter indicative of the thickness of the conductor wire when covered with the insulation layer, and an analyzing and control means to analyze monitored values received from the monitoring means and for controlling the position of the core tube along the passline, said means operable upon a monitored value differing from that required for a desired thickness of conductor wire to actuate the driving means and move the core tube in the appropriate direction to change the conductor wire thickness towards that desired.

As may be seen, the apparatus of the invention includes a core tube which is movable in the direction of the passline thereby providing for adjustment in the cross-sectional area of the flow passage and a control in the relative velocities of the molten material and of the conductor wire as they pass through the die orifice. As a result, the speed of the molten material may be controlled to be substantially equal to that of the conductor wire or insignificantly in excess of the velocity of the conductor wire so that no reduction or an insignificant reduction in the thickness of the conductor wire results. The thickness of the wire downstream of the cross-head is monitored, and the position of the core tube is automatically adjusted if the wire is drawn down excessively during the extrusion operation.

In a preferred arrangement, the core tube is mounted within the cross-head by a mounting means which comprises a screw thread means. In this screw thread means, a screw thread provided on the core tube is received within a complementary screw thread on the cross-head for mounting the core tube within the cross-head. Rotation of the core tube to cause relative rotation of the screw threads causes the core tube to move along the passline. Thus a large angular movement of the core tube will effect a short movement along the passline and hence its movement into desired positions may be infinitely controlled.

The invention also includes a method of insulating an electrical conductor wire comprising:- passing the wire along a passline through a core tube in a cross-head and then through a die orifice of an extrusion die of the cross-head while extruding a molten polymeric dielectric material around the wire; monitoring a parameter indicative of the thickness of the wire at a position downstream from the cross-head to determine whether the wire thickness differs from that desired; and upon any monitored value differing from that required for a desired conductor wire diameter, controllably moving the core tube in an appropriate direction along the passline and into a desired position so as to controllably adjust the distance between the core tube and an internal wall means of the cross-head which defines a flow passage for directing molten polymeric dielectric material to the core tube and thereby adjust the cross-sectional area of the passage to cause the thickness of the wire to approach that desired.

Embodiments of the invention will now be described by way of example, with reference to the accompanying drawings, in which.

Figure 1:
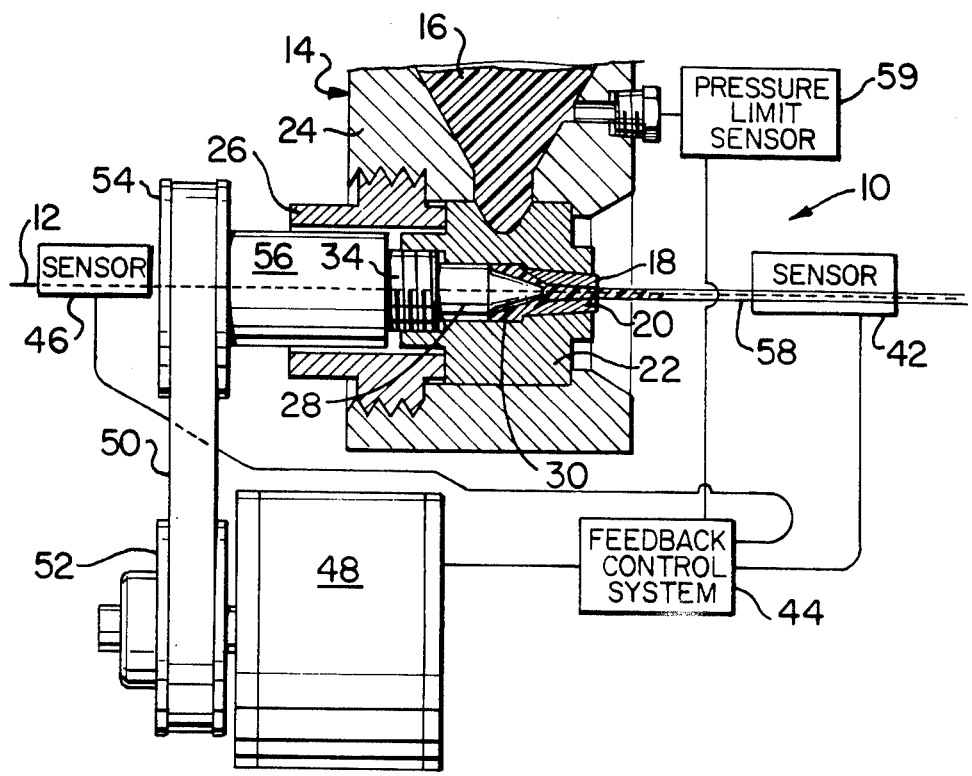
FIG. 1 is a diametric view, partly in cross-section, of apparatus for insulating an electrical conductor wire according to a first embodiment.

As shown in FIG. 1, in a first embodiment, an apparatus 10 for insulating an electrical conductor wire 12 comprises an extruder cross-head 14 secured to an outlet end of an extruder (not shown) for molten polymeric dielectric material 16. Flow passages within the cross-head convey the molten material 16 to a die orifice 18 provided by an extrusion die 20 held within a die holder 22. The die holder is held in position within a main housing 24 of the cross-head by a retaining nut 26 screwed into the upstream side of the housing 24.

Figure 2:
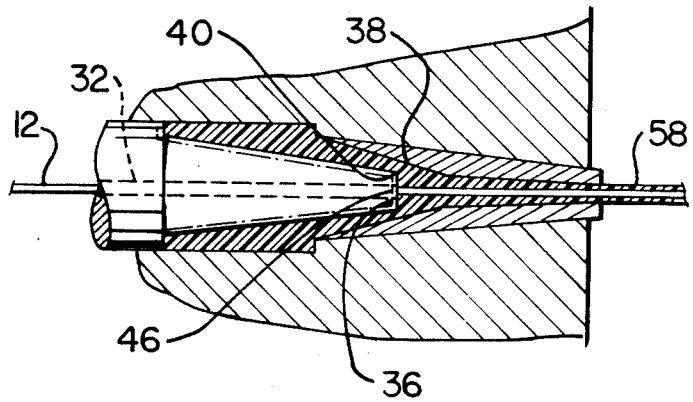
FIG. 2 is a cross-sectional view of part of an extruder cross-head of the apparatus shown in FIG. 1.

A core tube 28 is disposed within the die holder 22. The core tube is basically of conventional construction and comprises a tapering downstream end 30 and has a coaxial passage 32 for directing the conductor wire 12 through the die orifice as the wire moves along its passline. The core tube is provided with a mounting means to render it adjustable into any desired position along the passline. This mounting means comprises a screw thread means 34 consisting of a male screw thread on the core tube upstream from its tapered section and a complementary female screw thread formed within the upstream end of the die holder 22. As can be seen from FIG. 1, the die is thus locatable in position for operation by its screw threaded reception within the die holder. Thus when in operating position, the rotation of the core tube in either direction will cause a corresponding movement of the core tube in the appropriate direction along the passline of the conductor wire 12. As a result of this movement, the downstream end 36 (FIG. 2) of the core tube may be caused to move towards or away from internal wall means, i.e. frusto-conical wall 38 of the die holder, which defines a flow passage for the molten material as it moves towards the die orifice. Any movement in this fashion by the core tube results in an adjustment in the cross-sectional area of the flow passage at the position where the core tube and the wall 38 lie closest together, i.e. between the wall and the peripheral edge 40 of the end 46 as shown in FIG. 2. As will be appreciated, such displacement of the core tube will create a change in the pressure upon the polymeric material within the extruder and a resultant change in velocity of the molten material as it passes between the wall 38 and the core tube towards the die orifice. This change in velocity of the molten material is accompanied by a change in the relative velocities of the molten material and the conductor wire.

With the core tube disposed in one particular position along the passline, the velocities of the molten material and the conductor wire are substantially equal and the conductor wire is not drawn down as it passes through the die orifice. With this set of conditions, it is also found that there is substantially no die swell in the molten material so that the finished outside diameter of the insulation is as required. However should the core tube be closer to the wall 38 than its optimum position to provide the desired set of requirements, then there is a pressure built up upon the molten material within the extruder and the material is forced through the gap between the core tube and the wall 38 at a greater velocity thereby being extruded through the die orifice also at a greater velocity. In these sets of conditions, the diameter of the wire still remains at that required because there is no draw down upon the wire. However more molten material is used than is required thereby resulting in die swell upon exit from the die. This is a corresponding increase in the outside diameter beyond that needed for obtaining optimal electrical characteristics in the finished insulated conductor and certain of the electrical characteristics may depart from their desired values.

On the other hand if the core tube is moved upstream away from the optimal position, then the distance between the wall 38 and the core tube increases and the pressure upon the molten material is reduced thereby resulting in the velocity of the material being less than the conductor wire as it passes through the die orifice. Under this set of conditions, while the diameter of the insulated conductor may be substantially as required, a resultant draw down upon the wire decreases its diameter and also causes a departure of the electrical characteristics in the finished product from those required.

Hence it is possible to be able to adjust the position of the core tube within the cross-head easily by causing its rotation. As can be seen, a small rotation of the core tube will produce a corresponding and smaller movement of the core tube axially along the passline so that an infinite adjustment of the core tube is rendered possible. Such an adjustment may be performed manually as a result of measurements taken at intervals upon samples of insulated wire. However in a preferred arrangement of the invention as shown in this embodiment provision is made to monitor a parameter indicative of the conductor wire thickness. As will be described, this will allow for the provision of a continuous control upon the position of the core tube so as to ensure that there is no significant draw down of the conductor wire and that the outside diameter of the insulation is substantially that required in the finished product.

A monitoring means for the above purpose comprises a speed monitoring device 42 which is of conventional construction for monitoring the speed of wire. Electrical signals are sent from the device 42 to an analyzing and control means in the form of a microprocessor 44 which analyzes the value of the signals received from the sensor 42 together with datum signals received from another speed sensor 46 which is disposed at the upstream end of the cross-head. The signals received from sensor 46 correspond to the speed of the uninsulated wire. As can be seen, if the signal received from sensor 42 corresponds to a speed which is greater than that at sensor 46 then this must be as a result of a reduction in diameter or thickness of the conductor wire. When the signals differ in this way then a control signal is sent from the microprocessor 44 to a driving means in the form of a stepper motor 48 which is drivably connected to an endless drive member or belt 50 of the driving means. Belt 50 drivably connects a pulley wheel 52 of the motor 48 with a pulley wheel 54 secured coaxially at an upstream end of an extrusion 56 of the core tube.

It follows that in use, with the conductor 12 passing through the cross-head and being provided with a layer of insulation to form an insulated conductor wire 58, then the two speed sensors 42 and 46 provide signals which are being continually analyzed within the microprocessor 44. The microprocessor operates to send signals to the stepper motor 48 to control the position of the core tube 28 to ensure that the speed of the insulated conductor 58 is not significantly greater than the input speed of the conductor as measured by the sensor 46. The stepper motor is tended to be driven by the microprocessor to urge the core tube upstream in order to create a slight draw down of the conductor. However, this causes a differential with signals received from the sensors 42 and 46. Thus, control signals from the microprocessor control the stepper motor so as to hold the upstream movement of the die to absolute minimum consistent with holding the drawn down to an insignificant amount.

The apparatus is also provided with a pressure limit sensor 59 which is attached to the housing 24 and senses the pressure of the molten material within the cross-head as it moves towards the die. This sensor 59 is connected with the microprocessor and operates to modify the signals for operation of the core tube to ensure that pressure conditions within the extruder do not exceed an upper limit.

It has been found that with use of the invention according to the first embodiment, a satisfactory product has resulted. In this product, the degree of drawn down of a 22 AWG conductor wire has been minimal and has resulted in finished diameters for the wire within acceptable tolerances, i.e. the wire has been reduced to a diameter no less than 0.0198 inches from a starting diameter of 0.0201 inches. In addition to this the finished diameter of the insulation has differed insignificantly from that required in the finished product to produce the desired electrical characteristics for the insulated conductor.

Figure 3:
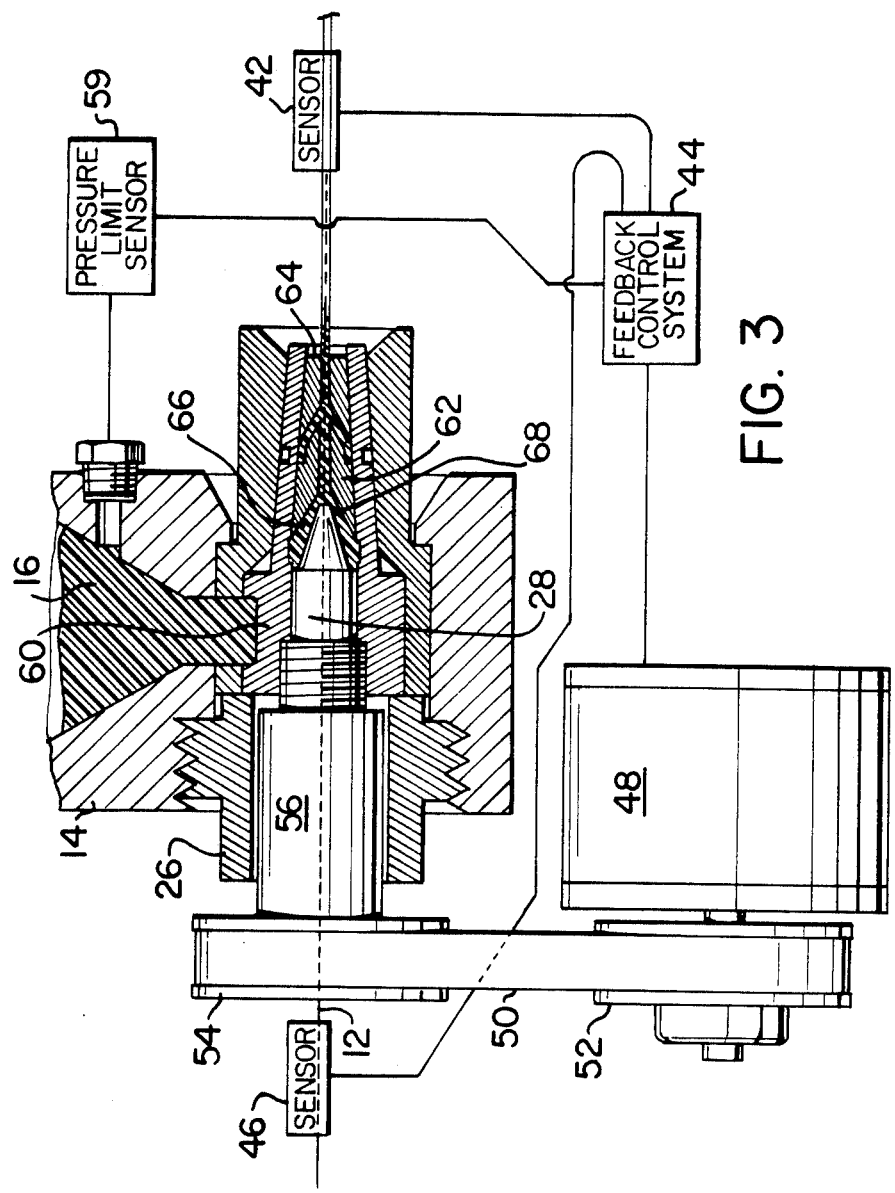
FIG. 3 is a view similar to FIG. 1 of a second embodiment.

The invention is also applicable to insulating conductor wire with more than one layer of insulation. For instance as shown in FIG. 3, in a second embodiment, a conductor wire 12 is insulated with two layers of polymeric material. In this embodiment, some parts of apparatus have the same design and operation as corresponding parts described in the first embodiment. In such cases the same reference numerals are used in the second embodiment.

In the second embodiment, the core tube 28 is disposed within a die holder 60 which is longer axially than the holder 22 described in the first embodiment. The holder 60 is designed to accommodate two dies 62 and 64. The upstream die 62 and its positional relationship to the core tube 28 is substantially as described for the die 20 in the first embodiment. Thus a flow passage 66 is provided between the core tube and an internal wall 68 of the die 62 and the affected cross-sectional area between the core tube and the wall may be varied by axial movement of the insert. The die 64 is disposed slightly downstream from the die 62 so as to form the cross-head into a dual cross-head construction. A second extruder (not shown) is provided for supplying molten material for the outer layer at die 64. With this arrangement, the two layers of insulation may both be solid, i.e. non-cellular or alternatively one of the layers may be of cellular construction. In this particular embodiment, the inner layer formed by the die 62 is of cellular or foam construction and the outer layer formed with the die 64 is of solid construction.

Operation of the apparatus according to the second embodiment is identical with that in the first embodiment with regard to the application of the first layer of insulation and the control of the thickness of the conductor wire. It has been found that draw down of conductor wire occurs only during application of the inner insulation layer. The control function therefore must be applied during the application of the first layer. Hence in the second embodiment as shown in FIG. 3, the movable core tube operates in the position upstream from the first die and no adjustment requirements are necessary for movement of the conductor through the second die.

What is claimed is:

1. Apparatus for insulating an electrical conductor wire comprising an extruder cross-head having an extrusion die defining a die orifice, internal wall means defining a flow passage for directing molten polymeric dielectric material to the die orifice, a core tube within the cross-head and upstream from the die orifice, the core tube defining a guide passage for directing the conductor wire through the die orifice as it moves along a passline, mounting means for the core tube to render it adjustable into any desired position along the passline, drive means operably connected to the core tube to controllably adjust the distance between the core tube and the wall means and thereby adjust the cross-sectional area of the flow passage, a monitoring means downstream from the cross-head for monitoring a parameter indicative of the thickness of the conductor wire when covered with the insulation layer, and an analyzing and control means to analyze monitored values received from the monitoring means and for controlling the position of the core tube along the passline, said means operable upon a monitored value differing from that required for a desired thickness of conductor wire to actuate the driving means and move the core tube in the appropriate direction to change the conductor wire thickness towards that desired.

2. Apparatus according to claim 1 wherein the mounting means comprises a screw thread on the core tube and a complementary screw thread on the cross-head, the screw threads engaged for mounting the core tube within the cross-head, and rotation of the core tube causing relative rotation of the screw threads to cause the core tube to more along the passline, and the driving means is connected to the core tube to effect its rotation.

3. Apparatus according to claim 1, wherein the monitoring means comprises an upstream speed monitoring device for monitoring the speed of the wire upstream of the extruder cross-head and a downstream speed monitoring device for monitoring the speed of the wire downstream of the extruder cross-head, and the analyzing and control means is operable upon the speed of the wire downstream of the cross-head exceeding the speed of the wire upstream of the cross-head by more than a predetermined value to move the core tube downstream.

4. Apparatus according to claim 2 wherein the driving means comprises a stepper motor and an endless drive member drivably connecting the motor with the core tube.

5. A method of insulating an electrical conductor wire comprising:
passing the wire along a passline through a core tube in a cross-head and then through a die orifice of an extrusion die of the cross-head while extruding a molten polymeric dielectric material around the wire;
monitoring a parameter indicative of the thickness of the wire at a position downstream from the cross-head to determine whether the wire thickness differs from that desired; and upon any monitored value differing from that required for a desired conductor wire diameter, controllably moving the core tube in an appropriate direction along the passline and into a desired position so as to controllably adjust the distance between the core tube and an internal wall means of the cross-head which defines a flow passage for directing molten polymeric dielectric material to the die orifice and thereby adjusting the effective cross-sectional area of the passage to cause the thickness of the wire to approach that desired.

6. A method according to claim 5 wherein the core tube is mounted in the cross-head by a screw thread means and the method comprises moving the core tube by rotation thereof, the screw thread means effecting a displacement of the core tube along the passline.

7. A method according to claim 6 comprising analyzing monitored values indicative of the wire thickness and upon monitored values differing from that required, causing a control means to actuate a driving means to move the core tube in the appropriate direction.

8. A method according to claim 5, wherein monitoring a parameter indicative of the thickness of the wire at a position downstream from the cross-head, comprises monitoring the speed of the wire at positions upstream and downstream of the cross-head and computing the difference between the monitored wire speeds.

9. A method according to claim 8, comprising moving the core tube downstream when the speed of the wire downstream of the cross-head exceeds the speed of the wire upstream of the cross-head by more than a predetermined value.

* * * * *